(12) United States Patent
Chi et al.

(10) Patent No.: US 10,890,770 B2
(45) Date of Patent: Jan. 12, 2021

(54) WAVEGUIDE HAVING PARTIAL REFLECTOR

(71) Applicant: Facebook Technologies, LLC, Menlo Park, CA (US)

(72) Inventors: Wanli Chi, Sammamish, WA (US); Matthieu Charles Raoul Leibovici, Seattle, WA (US); Austin Lane, Bellevue, WA (US); Kavous Jorabchi, Bellevue, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 139 days.

(21) Appl. No.: 16/192,474

(22) Filed: Nov. 15, 2018

(65) Prior Publication Data
US 2020/0158928 A1     May 21, 2020

(51) Int. Cl.
*G02B 27/01* (2006.01)
*G02B 5/18* (2006.01)

(52) U.S. Cl.
CPC ....... *G02B 27/0172* (2013.01); *G02B 5/1842* (2013.01)

(58) Field of Classification Search
CPC .................. G02B 27/0172; G02B 5/1842
See application file for complete search history.

(56) References Cited

U.S. PATENT DOCUMENTS

| 2013/0250431 A1 | 9/2013 | Robbins et al. |
| 2017/0336552 A1 | 11/2017 | Masuda et al. |

FOREIGN PATENT DOCUMENTS

JP     2013127489     6/2013

*Primary Examiner* — Wen Huang
(74) *Attorney, Agent, or Firm* — Pequignot + Myers; Matthew A. Pequignot (57) ABSTRACT

A waveguide, e.g. an image-replicating waveguide, is provided. The waveguide includes a substrate having two outer surfaces, for propagating a beam of image light in the substrate by reflecting the beam from the outer surfaces. A diffraction grating is supported by the substrate and configured for diffracting the impinging beam. A partial reflector is disposed in the substrate between and parallel to the first and second surfaces. The partial reflector is configured for splitting the impinging beam, increasing the number of beam portions in the waveguide, thereby improving output pupil density.

20 Claims, 11 Drawing Sheets

WAVEGUIDE HAVING PARTIAL REFLECTOR

TECHNICAL FIELD

The present disclosure relates to optical components, and in particular to waveguides usable in wearable displays.

BACKGROUND

Head-mounted displays (HMDs), near-eye displays, and other wearable display systems can be used to provide virtual scenery, or to augment real scenery with dynamic information, data, or virtual objects. The virtual or augmented scenery can be three-dimensional (3D) to enhance the experience and to match virtual objects to real 3D objects observed by a user. In some display systems, an eye position and gaze direction, and/or orientation of the user in 3D space are tracked in real time, and the displayed scenery is dynamically adjusted depending on the user's head orientation and gaze direction, to provide a better experience of immersion into a simulated or augmented 3D environment.

Lightweight and compact near-eye displays reduce strain on user's head and neck, and are generally more comfortable and easy to wear. The optics of such displays can be the heaviest module of the entire system. Compact planar optical components, such as waveguides, gratings, Fresnel lenses, etc., may be employed to reduce size and weight of an optics block. However, compact planar optics may have limitations related to image quality, exit pupil size and uniformity, field of view of the generated imagery, visual artifacts, pupil swim, etc.

BRIEF DESCRIPTION OF THE DRAWINGS

Exemplary embodiments will now be described in conjunction with the drawings, in which.

DETAILED DESCRIPTION

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1, 6A to 6D, 7A, 7B, 8A, 8B, 9A, 9B, and FIG. 10, similar elements are denoted with similar reference numerals.

A pupil-replicating waveguide may be used to carry an image from a projector to an eye of a user. A high degree of flatness and parallelism of waveguide surfaces is required to maintain a good quality of the observed image. It is easier to polish a thicker optical component, such as a waveguide, to high flatness and parallelism. However, a thicker image-replicating waveguides may have areas of an output pupil where image brightness sharply drops due to so-called "holes" in the output pupil. The holes may appear due to larger lateral offsets of the image beam upon reflection from outer surfaces of a thicker waveguide. In accordance with the present disclosure, the output pupil holes may be reduced or even completely eliminated by providing a partial reflector disposed at a certain depth between the outer surfaces of the waveguide. The partial reflector creates additional portions of the beam of image light that may fill the waveguide's output pupil more uniformly.

In accordance with the present disclosure, there is provided a waveguide comprising a substrate having first and second outer surfaces for propagating a beam of image light in the substrate by reflecting the beam from the first and second surfaces. A diffraction grating is supported by the substrate and configured for diffracting the impinging beam. A first partial reflector is disposed in the substrate between and parallel to the first and second surfaces. The first partial reflector is configured for splitting the impinging beam. The substrate may include at least one of a plastic material or a glass material. The first partial reflector may include at least one of a silicon nitride layer, a silicon oxide layer, or a titanium oxide layer.

The beam may reflect from the first and second outer surfaces of the substrate in a zigzag pattern by total internal reflection (TIR) having a critical angle. The first partial reflector may have a reflectivity of no greater than 2% at incidence angles of the beam less than the critical angle. In some embodiments, the reflectivity of the first partial reflector is no greater than 1% at incidence angle of the beam greater than 15 degrees but smaller than the critical angle. A reflectivity of the first partial reflector may increase with incidence angle at angles exceeding the critical angle. The reflectivity of the first partial reflector may also have a pre-determined wavelength and/or polarization dependence.

The diffraction grating may be disposed in the substrate between the first and second surfaces. In some embodiments, the diffraction grating comprises a volume Bragg grating (VBG), and/or a surface relief grating disposed e.g. at the first outer surface. The substrate may include a first portion comprising the first surface and a second portion comprising the second surface, such that the VBG (or a diffraction grating of another type, as the case may be) is stacked between the first and second portions of the substrate, and the first partial reflector is supported by the second portion opposite the second surface. In some embodiments, the substrate includes a first portion comprising the first surface, a second portion, and a third portion comprising the second surface and the first partial reflector opposite the second surface. The VBG or another type diffraction grating may be stacked between the first and second portions, and the second portion may be stacked between the grating and the third portion. A sum of thicknesses of the first and second portions may be less than a thickness of the third portion. The waveguide may include a second partial reflector disposed in the substrate between and parallel to the first and second outer surfaces. The second partial reflector may be configured for splitting the impinging beam.

In accordance with the present disclosure, there is further provided a near-eye display comprising any of the waveguides described above and a light source for providing the beam of image light to the waveguide. The light source has a source pupil and the waveguide having an exit pupil larger than the source pupil. The exit pupil has a pupil fill factor dependent on a reflectivity of the first partial reflector.

In accordance with the present disclosure, there is further provided a method for expanding a beam of image light. The method includes propagating the beam in a substrate by reflecting the beam from first and second outer surfaces of the substrate, thereby causing the beam to impinge on a diffraction grating supported by the substrate, and to diffract on the diffraction grating. As the beam propagates by reflecting from first and second outer surfaces, the beam impinges onto a partial reflector disposed in the substrate between and parallel to the first and second outer surfaces, the partial reflector causing the beam to split for further propagation in the substrate. A portion of the beam split by the partial reflector may increase with an angle of incidence of the beam onto the partial reflector.

Figure 1:
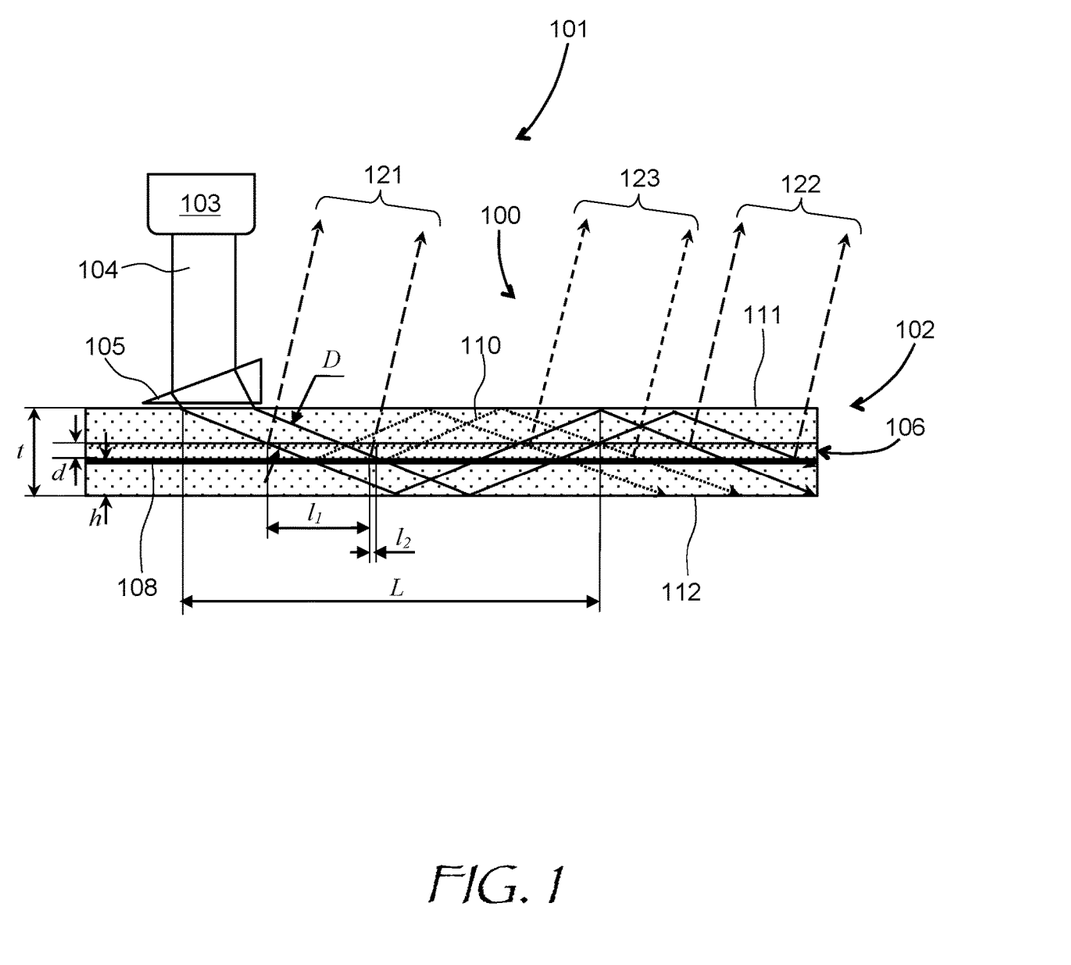
FIG. 1 is a side cross-sectional view of a near-eye display including a waveguide of the present disclosure.

Referring now to FIG. 1, a near-eye display (NED) 101 includes a waveguide 100 optically coupled to an image light source 103 by a coupler, such as a prism 105. The waveguide 100 includes a substrate 102 having first 111 and second 112 outer surfaces for propagating a beam 104 of image light generated by the image light source 103 in the substrate 102 by reflecting the beam 104 from the first 111 and second 112 surfaces. The beam 104, shown in solid lines, is in-coupled by the prism 105 (a diffraction grating may also be used) at an angle exceeding a total internal reflection (TIR) critical angle of the beam 104 inside the substrate 102, to cause the beam 104 propagate in the substrate 102 by TIR from the first 111 and second 112 surfaces in a zigzag pattern, as shown. A volume Bragg grating (VBG) 106 may be sandwiched between two halves of the substrate 102. The VBG 106 may be configured for diffracting a first portion 121 of the impinging beam 104 out of the substrate 102 at the first incidence, diffracting a second portion 122 at the second incidence, and so on, thereby expanding the beam of image light or in other words, expanding the exit pupil to be larger than the source pupil. The diffracted beam portions 121, 122 are shown in long-dash lines. Note that the diffracted beam portions 121, 122 are produced only upon impinging from above the VBG 106 in FIG. 1 and not from bottom, as a consequence of the VBG geometry used in this example.

A partial reflector 108 is disposed in the substrate 102 between and parallel to the first 111 and second 112 outer surfaces. In operation, the partial reflector 108 splits off a portion 110 of the impinging beam 104. The split portion 110 is shown with dotted lines. The split portion 110 impinges onto the VBG 106, producing a third diffracted beam portion 123 for observation by a user. The third diffracted beam portion 123 is shown in short-dash lines. The third diffracted beam portion 123 propagates between the first 121 and second 122 diffracted beam portions, thereby filling an output pupil hole between the first 121 and second 122 diffracted beam portions. Note that only one splitting of the beam 104 by the partial reflector 108 is shown for brevity. In actuality, multiple partial reflections will occur, providing multiple diffracted beam portions.

Figure 2A:
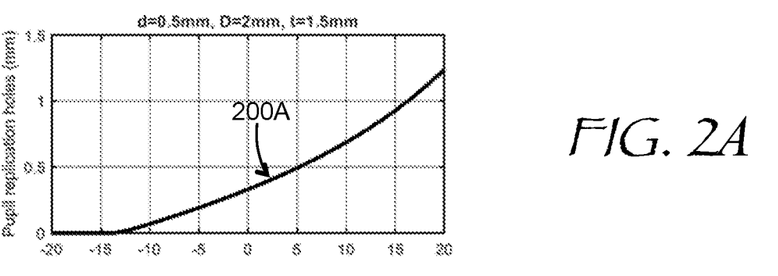
FIGS. 2A and 2B are graphs of pupil hole size and pupil fill factor, respectively, plotted as a function of a viewing angle for a 1.5 mm thick pupil-replicating waveguide without a partial reflector.

The formation of output pupil holes is explained in more details in FIGS. 2A, 2B, 3A, and 3B. Referring first to FIG. 2A, a linear size of pupil replication holes is plotted as a function of viewing angle, i.e. the angle of the diffracted beam portions 121, 122, and 123 of FIG. 1. In the example of FIG. 2A, the substrate 102 has a thickness t of 1.5 mm, the VBG 106 has a thickness d of 0.5 mm, and the beam 104 has a diameter D of 2 mm. D is also the light source 103 pupil diameter (FIG. 1). The size of pupil replication holes His defined as $$H = L - (l_1 + l_2) \tag{1}$$

where L, $l_1$, and $l_2$ are illustrated in FIG. 1. At the angle of approximately −12 degrees, the holes begin to appear, as evidenced by a portion of a curve 200A of FIG. 2A raising above zero. When the user's eye is placed near one of these holes, the perceived brightness of a wearable display sharply drops, similarly to vignetting of an ocular view through a microscope or telescope when the eye is misaligned with the eyepiece.

Figure 2B:
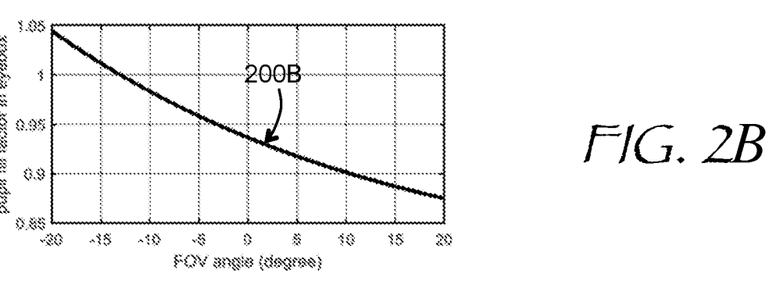

FIG. 2B shows a pupil fill factor F as a function of the viewing angle. The fill factor F is defined herein as $$F = (l_1 + l_2)/L \tag{2}$$

At the angle of approximately −12 degrees, the fill factor F drops below unity, as evidenced by a falling portion of a curve 200B of FIG. 2B. The fill factor F below unity indicates the presence of the pupil replicating holes.

Figure 3A:
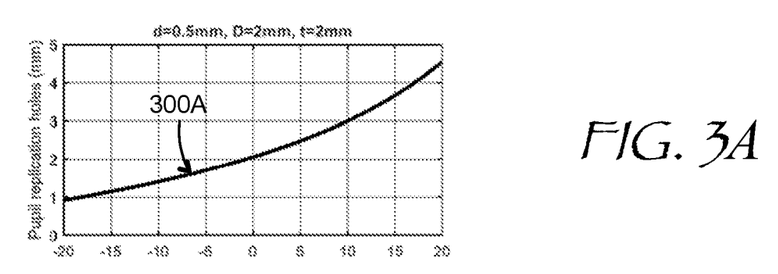
FIGS. 3A and 3B are graphs of pupil hole size and pupil fill factor, respectively, plotted as a function of a viewing angle for a 2 mm thick pupil-replicating waveguide without a partial reflector.
Figure 3B:
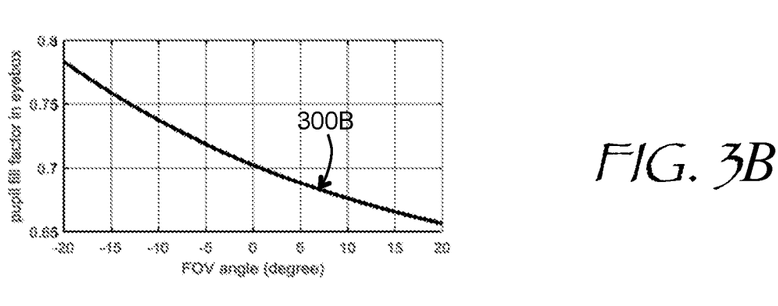

FIGS. 3A and 3B show results of the H and F calculations for the substrate 102 thickness t of 2.0 mm. At this thickness, the pupil replication holes appear at any viewing angle, as evidenced by a curve 300A of FIG. 3A being above zero at all values of the viewing angle, and a curve 300B of FIG. 3B being below unity at all values of the viewing angle.

Figure 4A:
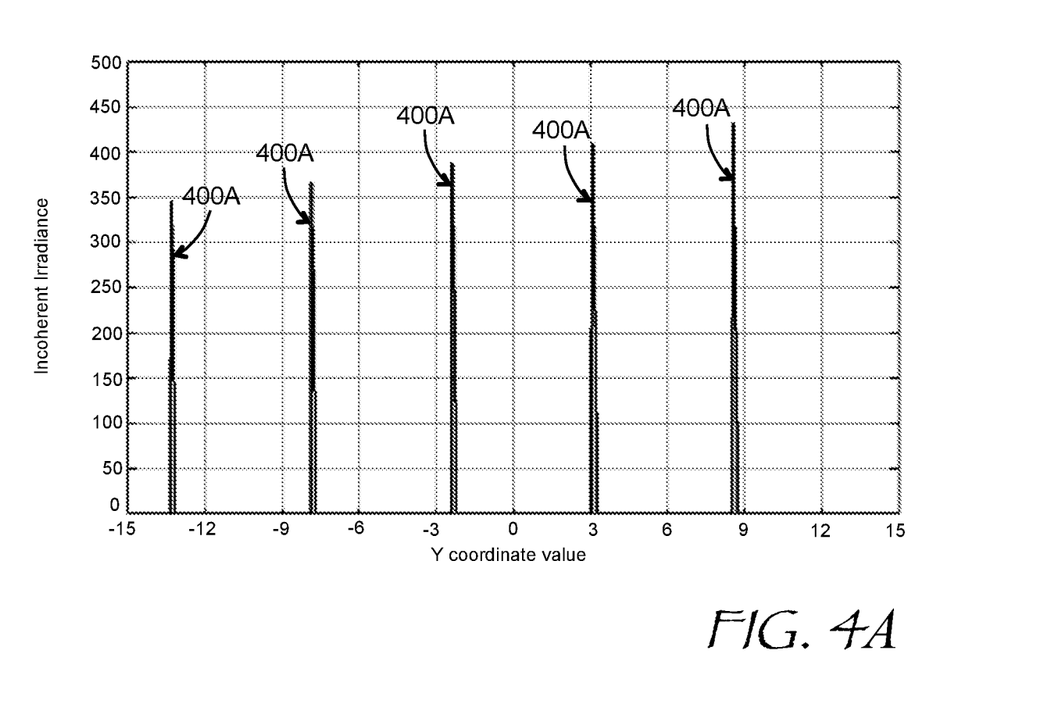
FIG. 4A is a graph of irradiance along a pupil-replicating waveguide without a partial reflector.
Figure 4B:
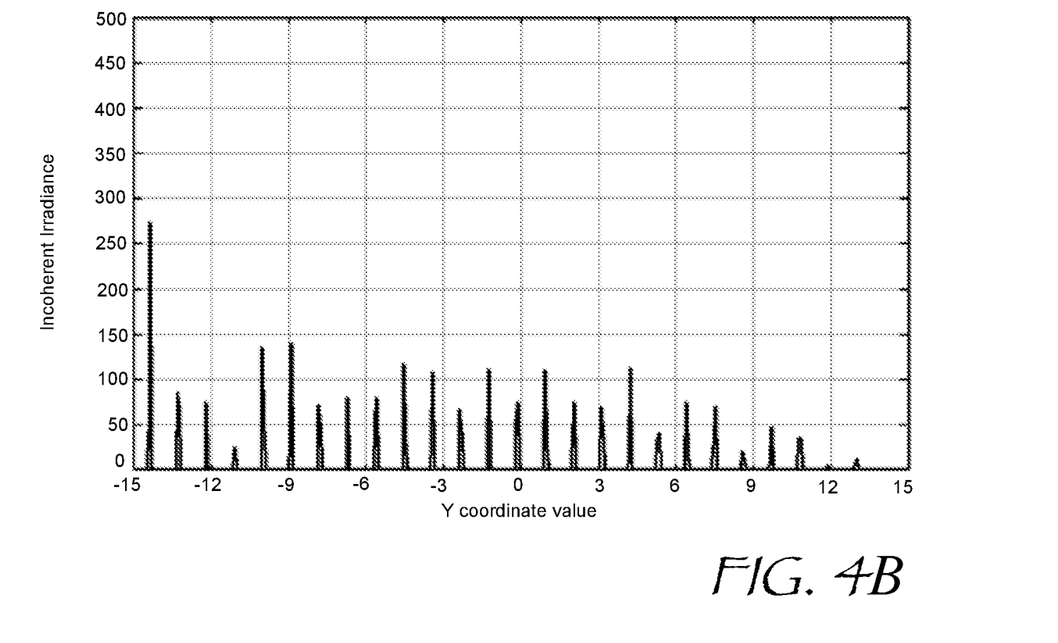
FIG. 4B is a graph of irradiance along a pupil-replicating waveguide with a partial reflector.

FIGS. 4A and 4B illustrate the effect of adding the partial reflector 108 to the substrate 102. Referring first to FIG. 4A, peaks 400A correspond to a diffracted beam positions when the partial reflector 108 is absent in the substrate 102. In this numerical simulation, the substrate 102 thickness t=1.5 mm; the VBG 106 thickness d=0.5 mm; the VBG 106 height h (FIG. 1) is 0.3 mm, and the beam angle inside the waveguide substrate 102 is 62°. The simulation results show that, when the partial reflector 108 is absent, a diffracted beam is emitted approximately every 5 mm along the first surface 111 of the substrate 102. Turning now to FIG. 4B, peaks 400B correspond to a diffracted beam positions for a case when the partial reflector 108 is present in the substrate 102. The other parameters of the calculation are the same as for FIG. 4A. One can see that the peaks 400B (FIG. 4B), although being of a smaller amplitude, are spaced much more frequently, i.e. approximately every 1 mm, thereby filling up pupil replication holes.

Accordingly, a method for expanding a beam of image light, e.g. the beam 104, may include propagating the beam 104 in the substrate 102 by reflecting the beam 104 from the first 111 and second 112 outer surfaces of the substrate 102, thereby causing the beam 104 to impinge on a diffraction grating, e.g. the VBG 106 supported by the substrate 102, and to diffract on the diffraction grating. As the beam 104 propagates by reflecting from first 111 and second 112 outer surfaces, the beam 104 impinges onto a partial reflector disposed in the substrate 102 between and parallel to the first 111 and second 112 outer surfaces, such as the partial reflector 108. The partial reflector causing the beam to split for further propagation in the substrate 102, which fills the pupil holes as explained above with reference to FIGS. 1, 2A, 2B, 3A, 4B, and FIGS. 4A and 4B.

Figure 5A:
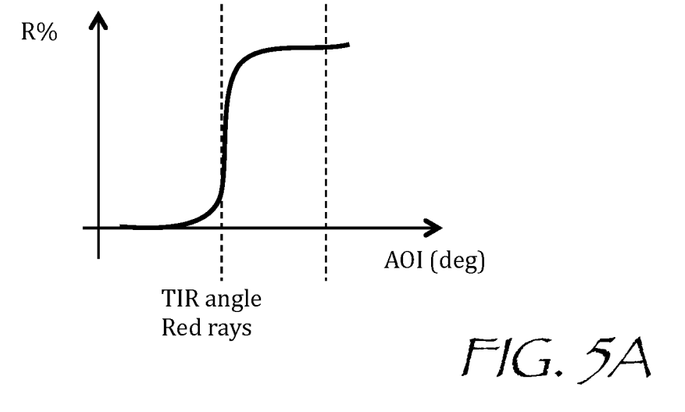
FIG. 5A is a graph of reflectivity of a partial reflector of a waveguide of this disclosure, plotted as a function of incidence angle.

Referring to FIG. 5A, a reflectivity R of the partial reflector 108 is plotted as a function of angle of incidence of a light beam for an augmented reality (AR) display application of the NED 101. In this embodiment, the reflectivity R should be kept low, e.g. no greater than 2%, at angles of incidence lower than a TIR critical angle. This increases optical throughput of the waveguide 100 for rays of external light, which have angles of incidence less than the critical angle, enabling the user to see the outside world more clearly while observing virtual imagery carried by the beam 104 of image light, propagating in the substrate 102 by TIR. The substrate 102 carries the image light beam 104 enabling the user to observe the virtual imagery superimposed with the real-world imagery. In one embodiment, the reflectivity of the partial reflector 108 is no greater than 1% at incidence angle of the beam greater than 15 degrees but smaller than the critical angle. This helps one to reduce so-called rainbow effects caused by outside light reflecting from fringes of the VBG 106 and the outer surfaces 111 and 112 of the substrate 102.

Figure 5B:
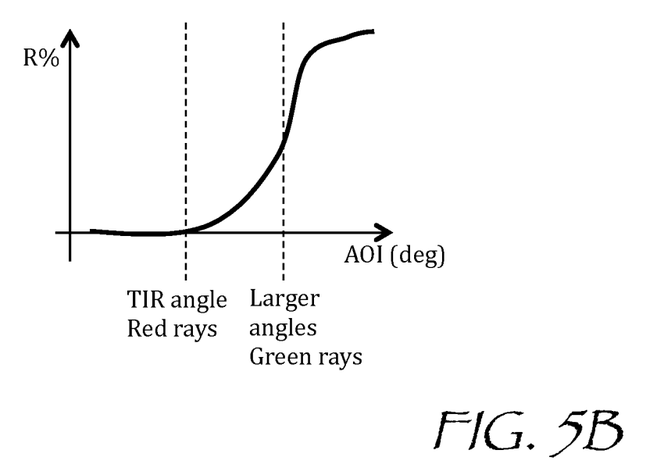
FIG. 5B is a graph of reflectivity of a partial reflector of a waveguide of this disclosure, wherein the reflectivity increases with the incidence angle.

Pupil holes density in an image-replicating waveguide depends on the viewing angle because different viewing angles correspond to different angles of beams inside the substrate 102 and, therefore, to different lateral beam offsets. At larger beam angles, the beam 104 exits the substrate 102 at larger intervals, which can be seen, for example, in FIGS. 2A, 2B, 3A, and 3B, showing increasing hole size and reducing pupil fill factor at the eyebox with increasing viewing angle. To offset this natural dependence of pupil density or pupil fill factor on the viewing angle, the reflectivity R of the partial reflector 108 may be made to increase with incidence angle at angles exceeding the critical angle, as shown in FIG. 5B. The increased reflectivity increases the portion of reflected light, facilitating filling the pupil holes.

In some embodiments, a stack of waveguides may be provided, with different color channels of the image being propagated predominantly in different waveguides. This may be done to increase the overall field of view of the display. In such configurations, different color channels have different angles of incidence in any particular waveguide, and for these configurations, the reflectivity R of the partial reflector 108 may have a wavelength dependence selected to optimize filling of pupil holes for different color channels. For example, in FIG. 5B, the reflectivity for green light monotonically increases after the critical TIR angle for the red light. Furthermore, the reflectivity R of the partial reflector 108 may have a pre-determined polarization dependence to provide an additional degree of freedom for optimizing the angular and wavelength dependence of the reflectivity R.

Figures 6A, 6B:
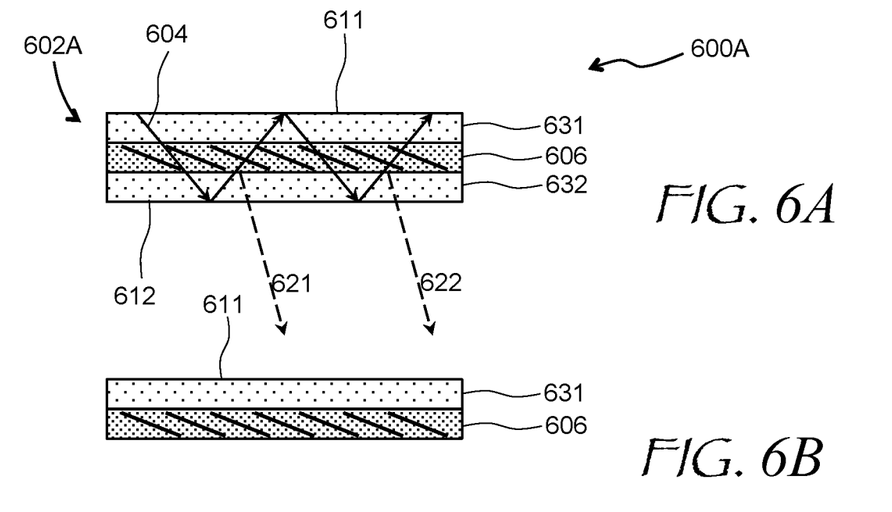
FIGS. 6A, 6B, and 6C are side cross-sectional views of a waveguide of a first embodiment at different stages of manufacture.
Figure 6C:
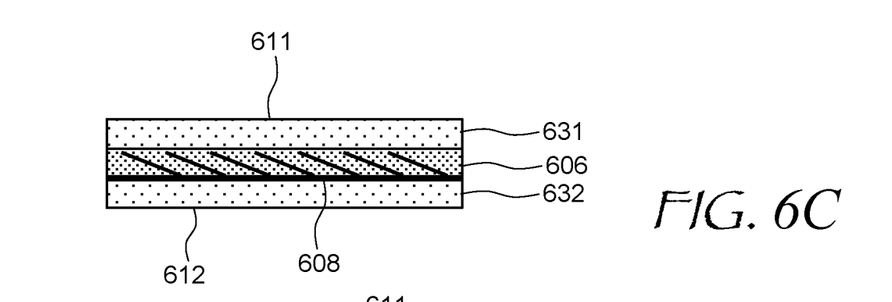
Figure 6D:
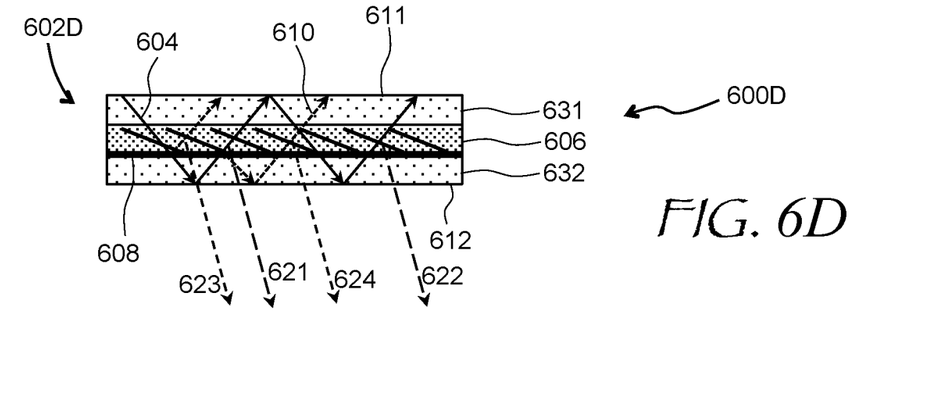
FIG. 6D is a side cross-sectional view of a manufactured waveguide of the first embodiment showing reflected and diffracted rays.

Various embodiments of a pupil-replicating waveguide, along with their exemplary manufacturing methods, will now be considered. Referring to FIGS. 6A to 6D, a blank waveguide 600A includes a VBG 606 sandwiched between first 631 and second 632 portions of a blank substrate 602A having first 611 and second 612 outer surfaces respectively. The blank waveguide 600A does not include a partial reflector. An image light beam 604 propagating in the blank substrate 602A by reflecting from the first 611 and second surfaces is out-coupled from the blank waveguide 600A by diffraction on the VBG 606 producing first 621 and second 622 portions of the image light beam 604. The first 621 and second 622 portions of the image light beam 604 are shown with long-dash arrowed lines. To provide a partial reflector, the second portion 632 of the blank substrate 602A may be stripped off (FIG. 6B), and a partial reflector 608 may be deposited, coated, sputtered, etc. on a side of the stripped second portion 632 opposite to the second surface 612, such that the partial reflector 608 is supported by the second substrate portion 632 opposite the second surface 612. The VBG 606 is then stacked between the first 631 and second 632 portions of a substrate 602D, the partial reflector 608 facing inwards (FIG. 6C). In operation, the image light beam 604 propagating in an image-replicating waveguide 600D impinges on the partial reflector 608 (FIG. 6D). The partial reflector 608 splits off a portion 610 of the image light beam 604. The split-off portion 610, shown with dotted arrowed lines, diffracts on the VBG 606, producing third 623 and fourth 624 diffracted beam portion shown in short-dash arrowed lines. The third 623 and fourth 624 diffracted beam portions may fill pupil holes of the waveguide. The partial reflector 608 may include e.g. a silicon nitride layer, a silicon oxide layer, a titanium oxide layer, or a combination of these layers forming a partial dielectric reflector. The substrate 602 may be made e.g. of a plastic material, a glass material, or both.

Figure 7A:
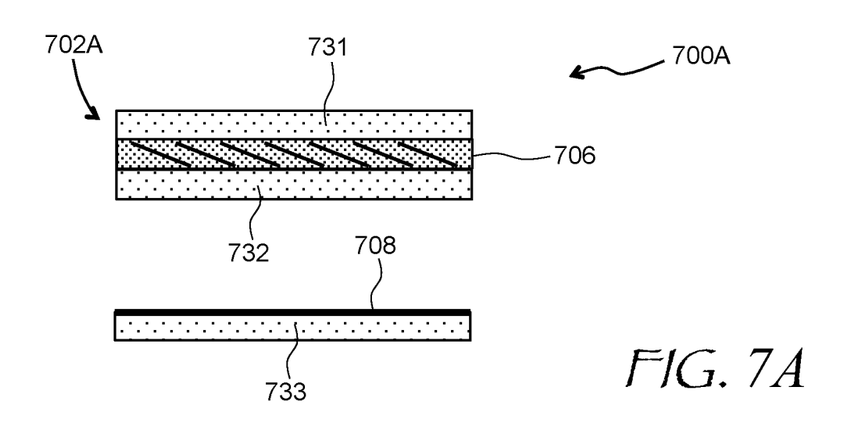
FIG. 7A is a side cross-sectional exploded view of a waveguide of a second embodiment.
Figure 7B:
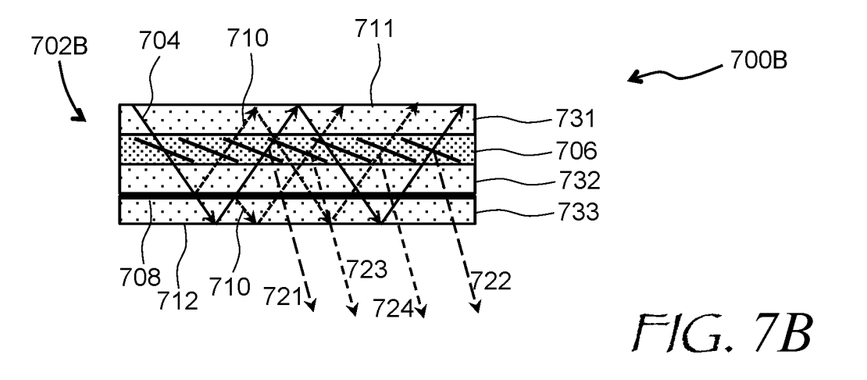
FIG. 7B is a side cross-sectional view of a manufactured waveguide of the second embodiment showing reflected and diffracted rays.

A waveguide of FIGS. 7A and 7B is similar to that of FIGS. 6A to 6D, but its manufacturing does not require the stripping of one of the substrate portions. A blank waveguide 700A (FIG. 7A) includes a VBG 706 sandwiched between first 731 and second 732 portions of a blank substrate 702A. The blank substrate 702A does not include a partial reflector. Instead, a separate third portion 733 may be coated with a partial reflector 708 and affixed to the second portion 732. A substrate 702B of a resulting image-replicating waveguide 700B (FIG. 7B) includes the first portion 731 comprising a first surface 711, the second portion 732, and the third portion 733 comprising a second surface 712 and the partial reflector 708 opposite the second surface 712. The VBG 706 is stacked between the first 731 and second 732 portions, and the second portion 732 is stacked between the VBG 706 and the third portion 733. In operation, an image light beam 704 propagating in the image-replicating waveguide 700B impinges on the VBG 706, producing first 721 and second 722 beam portions shown with long-dashed arrow lines. The image light beam also impinges on the partial reflector 708, which splits off portions 710 of the image light beam 704. The split-off portions 710, shown with dotted arrows, diffract on the VBG 706, producing third 723 and fourth 724 diffracted beam portions shown with short-dashed arrowed lines.

Figure 8A:
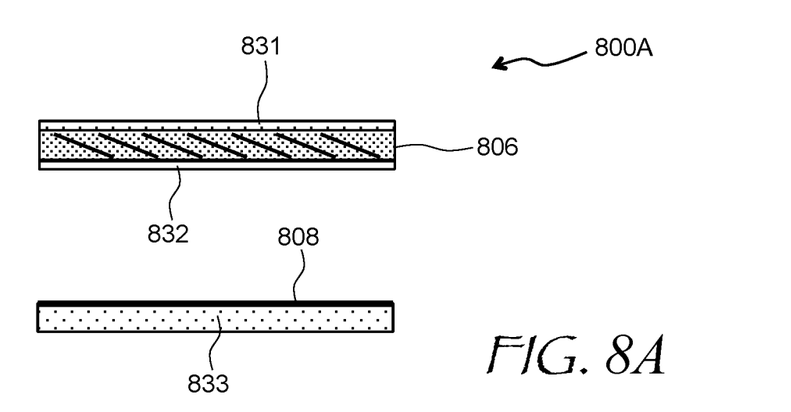
FIG. 8A is a side cross-sectional exploded view of a waveguide of a third embodiment.
Figure 8B:
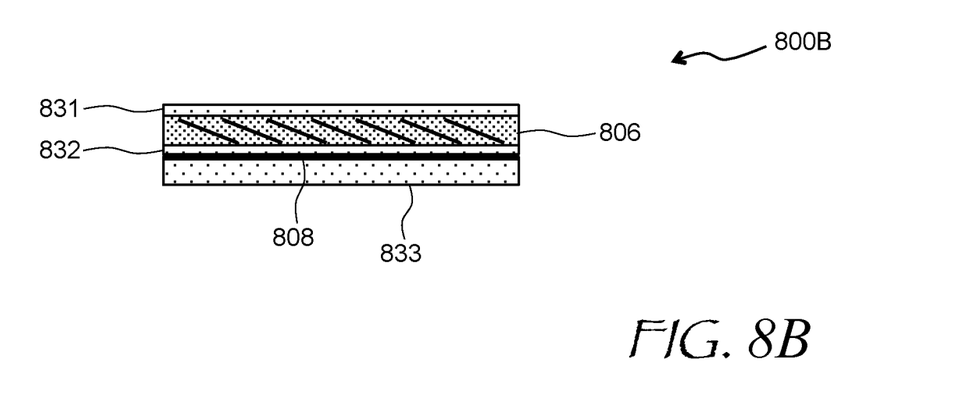
FIG. 8B is a side cross-sectional view of a manufactured waveguide of the third embodiment.

A waveguide of FIGS. 8A and 8B is similar to that of FIGS. 7A and 7B, but uses much thinner first 831 and second 832 substrate portions of an blank waveguide 800A around a VBG 806 (FIG. 8A), as compared to a thickness to a third substrate portion 833 including a partial reflector 808. In a pupil-replicating waveguide 800B (FIG. 8B), a sum of thicknesses of the first 831 and second 832 portions is less than a thickness of the third portion 833.

Figure 9A:
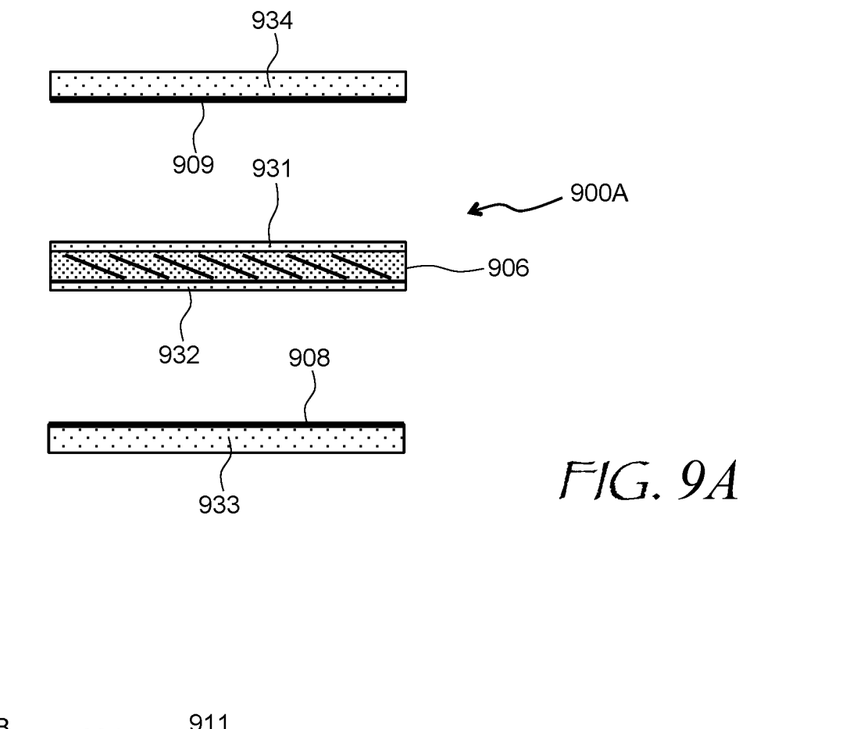
FIG. 9A is a side cross-sectional exploded view of a waveguide of a fourth embodiment.
Figure 9B:
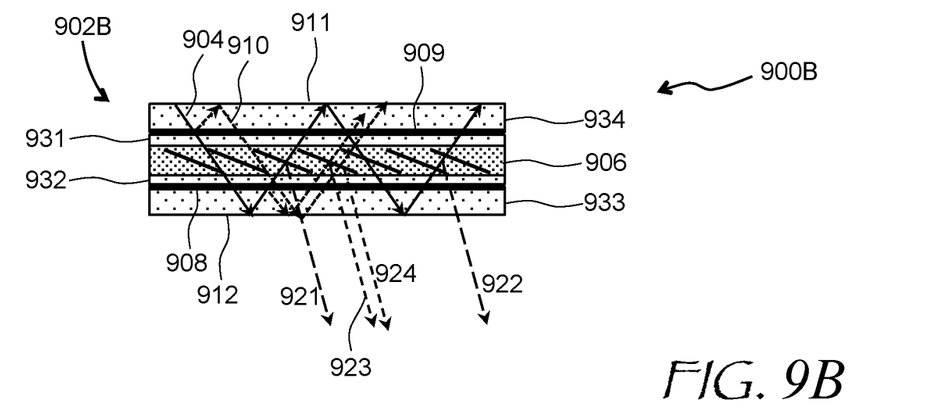
FIG. 9B is a side cross-sectional view of a manufactured waveguide of the fourth embodiment showing reflected and diffracted rays.

A waveguide of FIGS. 9A and 9B is similar to that of FIGS. 8A and 8B. Not one but two extra substrate portions are used, i.e. a third substrate portion 933 and a fourth substrate portion 934, each equipped with its own reflector: a first reflector 908 is supported by the third substrate portion 933, and a second reflector 909 is supported by the fourth substrate portion 934. To assemble a pupil-replicating waveguide 900B, the third 933 and fourth 934 substrate portions may be affixed to respective second 932 and first 931 opposed portions of a blank waveguide 900A, with reflectors 908, 909 pointing inwards as shown. The manufactured pupil-replicating waveguide 900B includes the first partial reflector 908 and the second partial reflector 909 on opposite sides of a VBG 906. The first 908 and second 909 partial reflectors are disposed in a substrate 902B between and parallel to first 911 and second 912 outer surfaces of the substrate 902B. In operation, an image light beam 904 propagating in the image-replicating waveguide 900B impinges sequentially on the second partial reflector 909, the VBG 906, and the first 908 partial reflector. The VBG 906 produces first 921 and second 922 diffracted beam portions shown in long-dashed arrows. The first 908 and second 909 partial reflectors split off portions 910 of the image light beam 904. The split-off portions 710 (dotted arrows) diffract on the VBG 706, producing third 923 and fourth 924 diffracted beam portions (short-dashed arrows).

Figure 10:
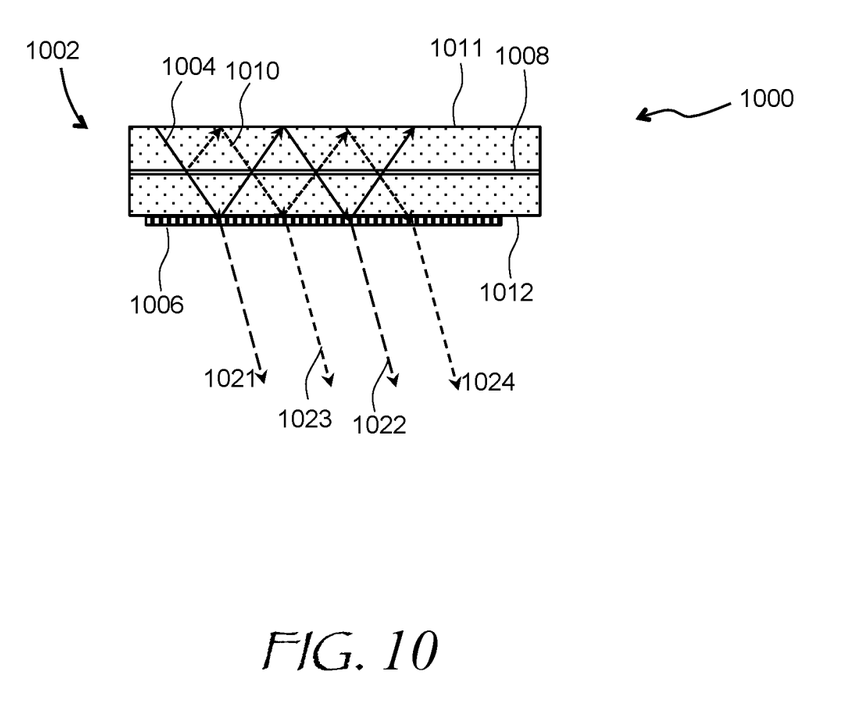
FIG. 10 is a side cross-sectional view of a waveguide including a surface-relief diffraction grating.

Waveguide examples considered so far included VBGs as diffractive elements for out-coupling imaging beam portions at different locations on the waveguide's output pupil. However, VBGs are not the only type of diffraction gratings that can be used. Referring, for instance, to FIG. 10, a pupil-replicating waveguide 1000 includes a surface-relief diffraction grating 1006 supported by a substrate 1002. A partial reflector 1008 is disposed in the substrate 1002 between and parallel to its first 1011 and second 1012 surfaces, e.g. in the middle between the first 1011 and second 1012 surfaces, as shown. In operation, an image light beam 1004 diffracts on the surface-relief diffraction grating 1006, providing diffracted beam portions 1021 and 1022 (long-dashed arrows). The partial reflector 1008 is configured for splitting portions 1010 (dotted arrows) from the impinging image light beam 1004 (solid arrows). The portions 1010 impinge upon, and diffract on the surface-relief diffraction grating 1006, producing diffracted beam portions 1023 and 1024 (short-dashed arrows). The surface-relief grating 1006 may of course be disposed at the first surface 1011, or even inside the substrate 1002. Furthermore, other type of diffraction gratings, e.g. hyperbolic metamaterial gratings, liquid crystal gratings, or so-called Pisa gratings comprising a plurality of slanted dielectric fringes, may be used. More broadly, any diffraction grating, or a plurality of diffraction gratings, supported by a substrate on the outside, inside, etc., and configured for diffracting an image light beam impinging thereon, may be used.

Figure 11A:
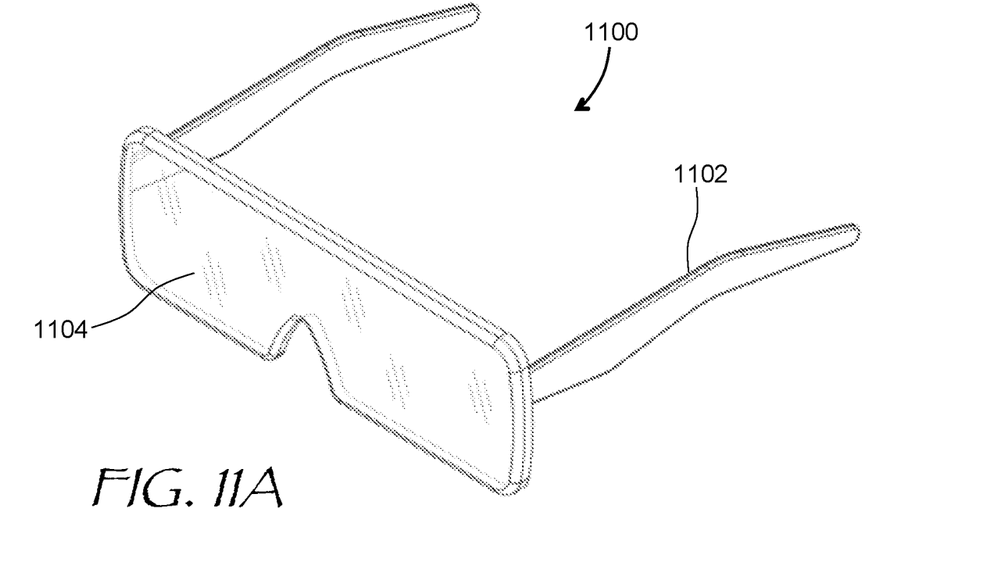
FIG. 11A is an isometric view of an eyeglasses form factor near-eye AR/VR display incorporating a waveguide of the present disclosure.
Figure 11B:
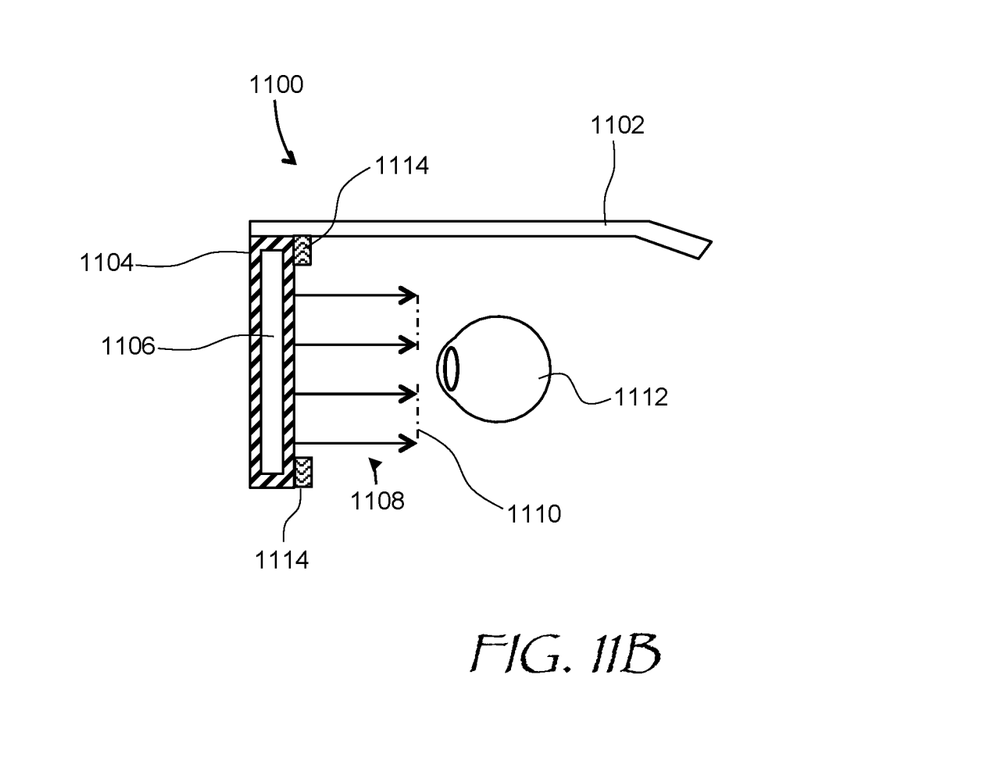
FIG. 11B is a side cross-sectional view of the display of FIG. 11A.

Referring to FIGS. 11A and 11B, a near-eye AR/VR display 1100 includes a body or frame 1102 having a form factor of a pair of eyeglasses. A display 1104 includes a pupil-replicating waveguide 1106 (FIG. 11B), which provides image light 1108 to an eyebox 1110, i.e. a geometrical area where a good-quality image may be presented to a user's eye 1112. The image-replicating waveguide 1106 may include any of the waveguides described herein, i.e. the waveguide 100 of FIG. 1, the waveguide 600D of FIG. 6D, the waveguide 700B of FIG. 7B, the waveguide 800B of FIG. 8B, the waveguide 900B of FIG. 9B, and/or the waveguide 1000 of FIG. 10.

An image light source of the near-eye AR/VR display 1100 may include, for example and without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. The near-eye AR/VR display 1100 may further include an eye-tracking system 1114 for determining, in real time, the gaze direction and/or the vergence angle of the user's eyes 1112. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, dynamically creating additional objects or pointers, etc. Yet furthermore, the near-eye AR/VR display 1100 may include an audio system, such a set of small speakers or headphones.

Figure 12:
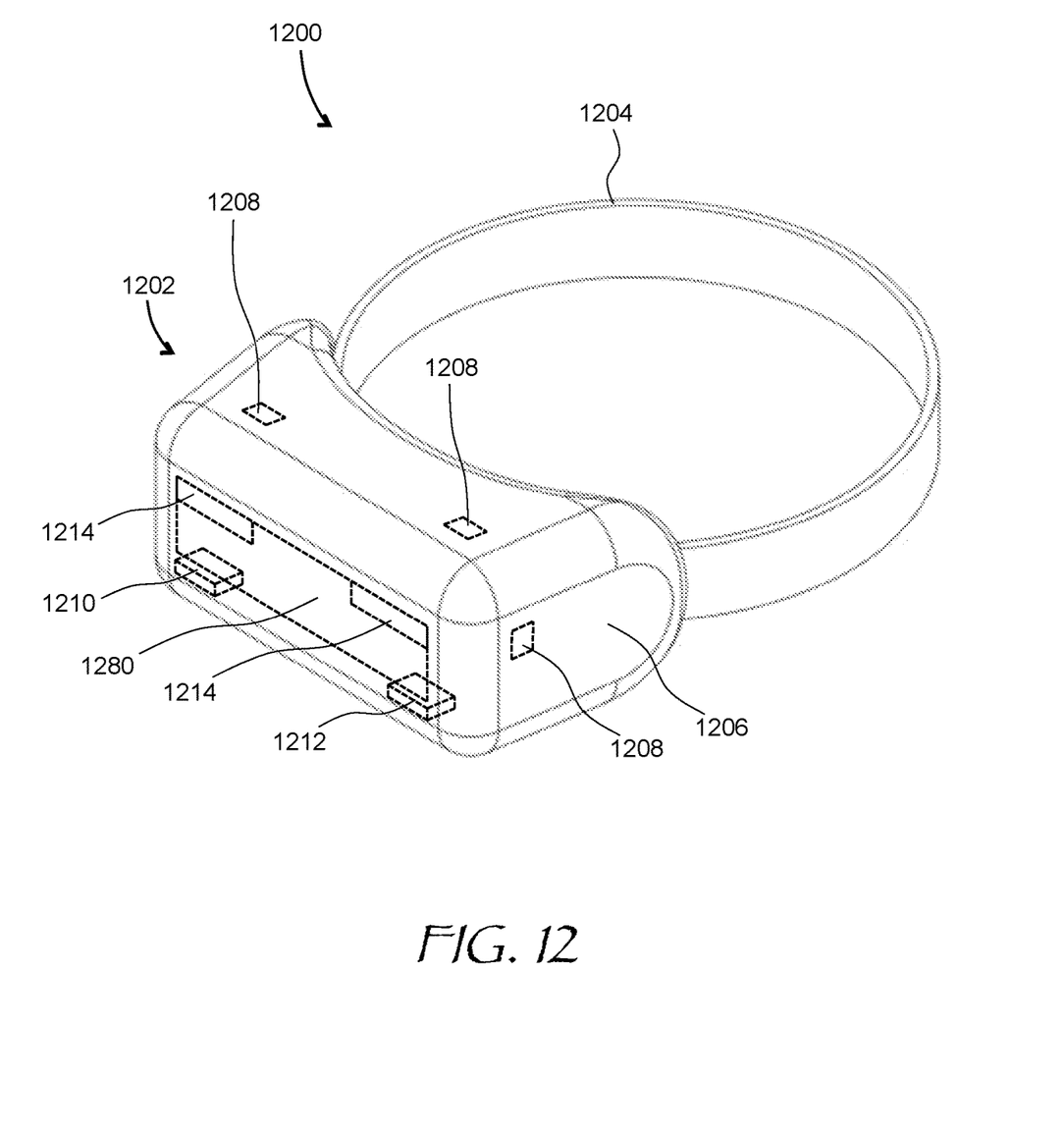
FIG. 12 is an isometric view of a head-mounted display (HMD) incorporating a waveguide of the present disclosure.

Turning now to FIG. 12, an HMD 1200 is an example of an AR/VR wearable display system enclosing user's eyes, for a greater degree of immersion into the AR/VR environment. The HMD 1200 may be a part of an AR/VR system including a user position and orientation tracking system, an external camera, a gesture recognition system, control means for providing user input and controls to the system, and a central console for storing software programs and other data for interacting with the user for interacting with the AR/VR environment. The function of the HMD 1200 is to augment views of a physical, real-world environment with computer-generated imagery, and/or to generate entirely virtual 3D imagery. The HMD 1200 may include a front body 1202 and a band 1204. The front body 1202 is configured for placement in front of eyes of the user in a reliable and comfortable manner, and the band 1204 may be stretched to secure the front body 1202 on the user's head. A display system 1280 may include any of the pupil-replication waveguides described herein. The display system 1280 may be disposed in the front body 1202 for presenting AR/VR images to the user. Sides 1206 of the front body 1202 may be opaque or transparent.

In some embodiments, the front body 1202 includes locators 1208, an inertial measurement unit (IMU) 1210 for tracking acceleration of the HMD 1200, and position sensors 1212 for tracking position of the HMD 1200. The locators 1208 are traced by an external imaging device of a virtual reality system, such that the virtual reality system can track the location and orientation of the HMD 1200. Information generated by the IMU and the position sensors 1212 may be compared with the position and orientation obtained by tracking the locators 1208, for improved tracking of position and orientation of the HMD 1200. Accurate position and orientation is important for presenting appropriate virtual scenery to the user as the latter moves and turns in 3D space.

The HMD 1200 may further include an eye tracking system 1214, which determines orientation and position of user's eyes in real time. The obtained position and orientation of the eyes allows the HMD 1200 to determine the gaze direction of the user and to adjust the image generated by the display system 1280 accordingly. In one embodiment, the vergence, that is, the convergence angle of the user's eyes gaze, is determined. The determined gaze direction and vergence angle may also be used for real-time compensation of visual artifacts dependent on the angle of view and eye position. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1202.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A waveguide comprising:
    a substrate comprising first and second outer surfaces for propagating a beam of image light in the substrate by reflecting the beam from the first and second surfaces;
    a diffraction grating supported by the substrate and configured for diffracting the beam impinging thereon; and
    a first partial reflector disposed in the substrate between and parallel to the first and second surfaces, wherein the first partial reflector is flat, extends across length and width of the substrate, and is configured for splitting the beam impinging thereon.

2. The waveguide of claim 1, wherein the diffraction grating is disposed in the substrate between the first and second surfaces.

3. The waveguide of claim 2, wherein the diffraction grating comprises a volume Bragg grating (VBG).

4. The waveguide of claim 3, wherein the substrate comprises a first portion comprising the first surface and a second portion comprising the second surface, wherein the VBG is stacked between the first and second portions of the substrate, and wherein the first partial reflector is supported by the second portion opposite the second surface.

5. The waveguide of claim 3, wherein the substrate comprises a first portion comprising the first surface, a second portion, and a third portion comprising the second surface and the first partial reflector opposite the second surface, wherein the VBG is stacked between the first and second portions, and wherein the second portion is stacked between the VBG and the third portion.

6. The waveguide of claim 5, wherein a sum of thicknesses of the first and second portions is less than a thickness of the third portion.

7. The waveguide of claim 1, further comprising a second partial reflector disposed in the substrate between and parallel to the first and second outer surfaces, wherein the second partial reflector is configured for splitting the beam impinging thereon.

8. The waveguide of claim 1, wherein in operation, the beam reflects from the first and second outer surfaces of the substrate in a zigzag pattern by total internal reflection (TIR) having a critical angle.

9. The waveguide of claim 8, wherein the first partial reflector has a reflectivity of no greater than 2% at incidence angles of the beam less than the critical angle.

10. The waveguide of claim 9, wherein the reflectivity of the first partial reflector is no greater than 1% at incidence angle of the beam greater than 15 degrees but smaller than the critical angle.

11. The waveguide of claim 8, wherein a reflectivity of the first partial reflector increases with incidence angle at angles exceeding the critical angle.

12. The waveguide of claim 1, wherein the substrate comprises at least one of a plastic material or a glass material.

13. The waveguide of claim 1, wherein the first partial reflector comprises at least one of a silicon nitride layer, a silicon oxide layer, or a titanium oxide layer.

14. The waveguide of claim 1, wherein a reflectivity of the first partial reflector has a pre-determined wavelength dependence.

15. The waveguide of claim 1, wherein a reflectivity of the first partial reflector has a pre-determined polarization dependence.

16. The waveguide of claim 1, wherein the diffraction grating comprises a surface relief grating disposed at the first outer surface.

17. A near-eye display comprising the waveguide of claim 1 and a light source for providing the beam of image light to the waveguide, the light source having a source pupil and the waveguide having an exit pupil larger than the source pupil;
    wherein the exit pupil has a pupil fill factor dependent on a reflectivity of the first partial reflector.

18. The near-eye display of claim 17, wherein the reflectivity increases with angle of incidence of the beam of image light onto the first partial reflector.

19. A method for expanding a beam of image light, the method comprising:
    propagating the beam in a substrate by reflecting the beam from first and second outer surfaces of the substrate, thereby causing the beam to impinge on a diffraction grating supported by the substrate, and to diffract on the diffraction grating;
    wherein, as the beam propagates by reflecting from first and second outer surfaces, the beam impinges onto a flat partial reflector extending across length and width of the substrate between and parallel to the first and second outer surfaces, the partial reflector causing the beam to split for further propagation in the substrate.

20. The method of claim 19, wherein a portion of the beam split by the partial reflector increases with an angle of incidence of the beam onto the partial reflector.

* * * * *